Patented June 11, 1929.

1,717,098

UNITED STATES PATENT OFFICE.

ALFRED R. L. DOHME, OF BALTIMORE, MARYLAND, ASSIGNOR TO SHARP & DOHME, INC., OF BALTIMORE, MARYLAND, A CORPORATION OF NEW JERSEY.

HEPTYL RESORCINOLS AND METHOD OF PRODUCING THE SAME.

No Drawing.  Application filed November 15, 1927. Serial No. 233,523.

The present invention relates to new higher alkyl resorcinols, namely, heptyl resorcinols, and particularly the normal heptyl resorcinol. The invention includes the new heptyl resorcinols as new products, and also a new method adapted particularly for the production of the normal heptyl resorcinol.

The normal heptyl resorcinol has a structural formula graphically represented as follows:

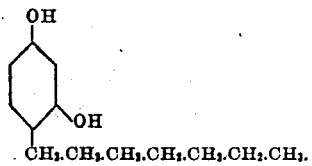

The new chemical substance, normal heptyl resorcinol, can be prepared in accordance with the method set forth in the following specific example, the parts being by weight.

To a solution of 125 parts of anhydrous zinc chloride in 300 parts of heptylic acid (the dissolving of the zinc chloride in the heptylic acid being aided by vigorous stirring and heating) there is slowly added 95 parts of resorcinol and the temperature is kept at about 125–135° C. After the addition of the resorcinol, the reaction mixture is stirred for about two hours while the above mentioned temperature is maintained. At the end of this time cold water is added and the solution stirred. The oily layer which separates is washed with cold water e. g. three times and the washed oil is finally distilled in a vacuum, with removal of the water and excess acid first by distillation, and finally the heptylyl resorcinol

is distilled. On cooling, the heptylyl resorcinol solidfies. In a purified state it has a boiling point of about 195 to 210° C. at 7 mm. The intermediate keytone thus produced, the normal heptylyl resorcinol, is then subjected to reduction. 155 parts of the distilled heptylyl resorcinol is reduced by about 400 parts of zinc amalgam in about 1200 parts of 1 to 1 hydrochloric acid. If heated and stirred vigorously the reduction may be completed in some six to eight hours. The reduced product is then washed three times with water and subjected to distillation, yielding normal heptyl resorcinol having a boiling point of 180 to 195° C. at 7 mm. On redistillation a product is obtained boiling at 186–188° at 7 mm. Recrystalization of this product gives a heptyl resorcinol of high purity and melting point of 73–74.5° C.

The new normal heptyl resorcinol is easily soluble in ether, alcohol, benzine and vegetable oils, but is difficultly soluble in water. It is non-toxic, has a high phenol coefficient, and possesses valuable therapeutic properties as an antiseptic and germicide.

In a similar manner, other heptyl resorcinols, such as iso-heptyl resorcinols, can be made starting with iso-heptylic acids, instead of the normal heptylic acid.

This application is a continuation in part of my prior application Serial No. 680,726 filed December 14, 1923.

The new heptyl resorcinols are included within the group of higher alkyl resorcinols claimed in my companion application Serial No. 26,813 filed April 29, 1925.

I claim:

1. The improved method of making heptyl resorcinols which comprises subjecting heptylyl resorcinols in a purified state to reduction with zinc amalgam and hydrochloric acid.

2. A product, comprising a heptyl resorcinol, having a high phenol coefficient and possessing valuable thereapeutic properties.

3. As a new product, normal heptyl resorcinol, said product having the graphically represented formula

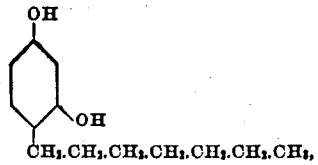

and being in a purified state in the form of colorless crystals possessing a melting point of about 73–74.5° C. being easily soluble in ether, alcohol and benzene, having a high phenol coefficient, and being a valuable therapeutic agent as an antiseptic and germicide.

In testimony whereof I affix my signature.

ALFRED R. L. DOHME.